US012104716B2

(12) United States Patent
Dittmann et al.

(10) Patent No.: US 12,104,716 B2
(45) Date of Patent: Oct. 1, 2024

(54) PINCH VALVE

(71) Applicant: Sartorius Stedim Systems GmbH, Guxhagen (DE)

(72) Inventors: Simon Dittmann, Goettingen (DE); Jan-Eike Schubert, Goettingen (DE); Michael Gohs, Goettingen (DE); Swen Weitemeier, Loedingsen (DE); Lars Boettcher, Melsungen (DE)

(73) Assignee: Sartorius Stedim Systems GmbH, Guxhagen (DE)

( * ) Notice: Subject to any disclaimer, the term of this patent is extended or adjusted under 35 U.S.C. 154(b) by 0 days.

(21) Appl. No.: 18/168,144

(22) Filed: Feb. 13, 2023

(65) Prior Publication Data
US 2023/0194003 A1  Jun. 22, 2023

Related U.S. Application Data

(63) Continuation of application No. PCT/EP2021/060391, filed on Apr. 21, 2021.

(30) Foreign Application Priority Data

Aug. 13, 2020 (DE) ............. 10 2020 121 356.5

(51) Int. Cl.
*F16K 7/06* (2006.01)
*F16K 27/02* (2006.01)

(52) U.S. Cl.
CPC .......... *F16K 7/063* (2013.01); *F16K 27/0236* (2013.01)

(58) Field of Classification Search
CPC .. A61M 39/28; A61M 39/283; A61M 39/284; A61M 39/285; A61M 39/286;
(Continued)

(56) References Cited

U.S. PATENT DOCUMENTS

| 2,958,502 A | 11/1960 | Grigsby |
| 3,408,034 A | 10/1968 | Lau |

(Continued)

FOREIGN PATENT DOCUMENTS

| CN | 108050268 A | 5/2018 |
| DE | 1038850 A | 9/1958 |

(Continued)

OTHER PUBLICATIONS

International Preliminary Report on Patentability, PCT/EP2021/060391, May 18, 2022, 7 pages.
(Continued)

*Primary Examiner* — Kevin F Murphy
*Assistant Examiner* — Jonathan J Waddy
(74) *Attorney, Agent, or Firm* — Edell, Shapiro & Finnan, LLC

(57) ABSTRACT

A pinch valve having a clamping member (300) mounted between two side walls (110) of a valve housing, the side walls extending parallel to a hose guide axis and to a plunger guide axis. Each of the side walls has a step (112) extending parallel to the hose guide axis and recessing with respect to the advancing direction of the plunger. The clamping jaws (320) of the pinch valve, upon displacement of the clamping member (300), move over the steps (112) with their outer sides, which face away from the hose guide, bearing against the side walls (110).

12 Claims, 7 Drawing Sheets

(58) Field of Classification Search
CPC ..... A61M 39/287; A61M 39/288; F16K 7/06; F16K 7/061; F16K 7/063; F16K 7/065; F16K 7/066; F16K 7/068; F16K 7/07; F16K 7/075; F16K 7/08; F16K 27/0236
USPC .................................................. 251/4, 6–10
See application file for complete search history.

(56) References Cited

U.S. PATENT DOCUMENTS

| | | | | |
|---|---|---|---|---|
| 4,136,694 A | * | 1/1979 | Kuehn | A61M 39/221 604/905 |
| 4,205,819 A | * | 6/1980 | Soika | A61M 39/28 251/340 |
| 4,315,424 A | * | 2/1982 | Jarman | B21D 25/04 72/457 |
| 4,744,596 A | * | 5/1988 | Hiller | B25J 15/0206 294/115 |
| 5,297,773 A | * | 3/1994 | Collins | F16K 7/063 251/9 |
| 5,867,877 A | * | 2/1999 | Patterson | F16B 45/06 24/598.5 |
| 6,142,979 A | * | 11/2000 | McNally | A61M 39/281 248/68.1 |
| 6,289,912 B1 | | 9/2001 | McPeak et al. | |
| 6,502,367 B1 | * | 1/2003 | Sterner | B65B 51/00 53/138.3 |
| 9,695,950 B2 | | 7/2017 | Weitemeier et al. | |
| 2007/0051909 A1 | * | 3/2007 | Bernstein | F16K 7/065 251/9 |

FOREIGN PATENT DOCUMENTS

| | | |
|---|---|---|
| DE | 1167137 B | 4/1964 |
| DE | 19917622 C2 | 5/2001 |
| DE | 102011055850 B3 | 11/2012 |
| EP | 0429813 A1 | 6/1991 |
| EP | 0634595 A1 | 1/1995 |
| EP | 2966326 A2 | 1/2016 |
| JP | 2003090446 A | 3/2003 |

OTHER PUBLICATIONS

German Office Action with English translation, Application No. 10 2020 121 356.6, Aug. 6, 2021, 10 pages.
International Search Report, PCT/EP2021/060391, Aug. 19, 2021, 2 pages.

* cited by examiner

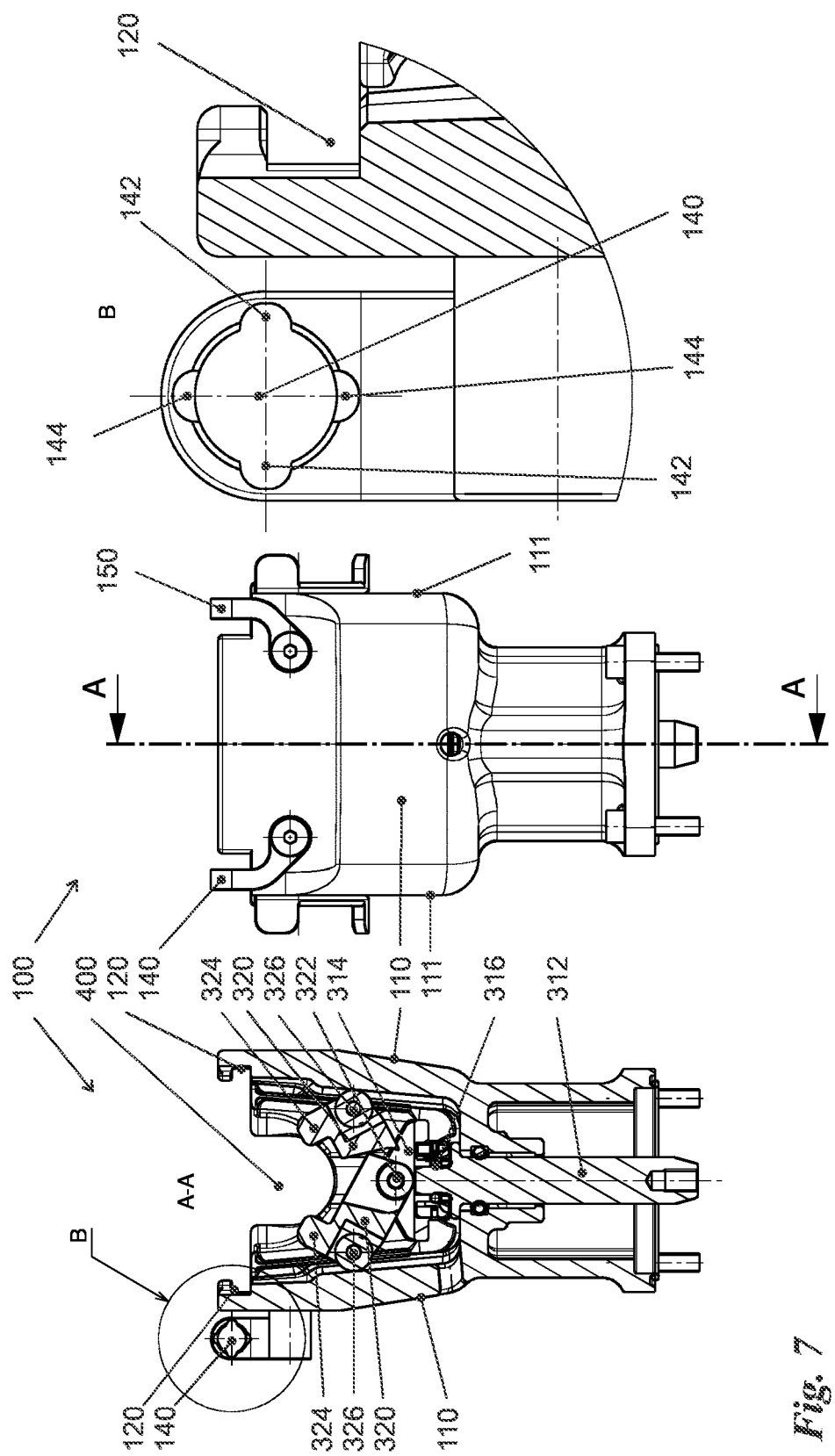

// PINCH VALVE

CROSS-REFERENCE TO RELATED APPLICATION

This is a Continuation of International Application PCT/EP2021/060391, which has an international filing date of Apr. 21, 2021, and the disclosure of which is incorporated in its entirety into the present Continuation by reference. This Continuation also claims foreign priority under 35 U.S.C. § 119(a)-(d) to and also incorporates by reference, in its entirety, German Patent Application DE 10 2020 121 356.5 filed on Aug. 13, 2020.

FIELD OF INVENTION

The invention relates to a pinch valve, comprising
a hose guide aligned along a hose guide axis,
a clamping member with
  a plunger slidably mounted along a plunger guide axis aligned perpendicular to the hose guide axis, and
  two clamping jaws jointly forming a clamping mouth and being articulated to the front end of the plunger, said front end facing the hose guide, and the two clamping jaws being pivotable in opposite directions about a pivot axis aligned parallel to the hose guide axis,
an abutment arranged on the side of the hose guide opposite the clamping member,
wherein the clamping member can be advanced towards the abutment to close the pinch valve, in that a hose guided in the hose guide is—if present—pressed against the abutment by the mouth base of the clamping mouth, thereby narrowing the lumen of the hose,
wherein the clamping jaws are coupled to a mechanical constraint such that a retraction of the plunger starting from a maximally advanced clamping position of the clamping member leads to a pivoting movement of the clamping jaws in the closing direction of the clamping mouth.

BACKGROUND

Such a pinch valve is known from DE 10 2011 055 850 B3.

Pinch valves are known in many variants. A basic type of pinch valve is disclosed, for example, in DE 199 17 622 C2. Such pinch valves have a hose guide into which a media-transporting, flexible hose can be inserted. The hose guide is used for more or less exact positioning of the hose between a clamping member and an abutment. The axial direction of the hose guide, i.e. the axial direction of the hose in the assembled state, defines a geometric axis referred to hereinafter as the hose guide axis. The salient element of a pinch valve is the clamping member, which can be moved perpendicular to the hose guide axis towards the abutment. The axial direction or direction of movement of the clamping member, in particular of its plunger, defines a geometric axis referred to hereinafter as the plunger guide axis. Advancing the clamping element, i.e. moving it towards the abutment, causes the free lumen of the hose guide to narrow, thus squeezing an elastically flexible hose inserted in the hose guide. As a result, the free lumen of the hose narrows until it is completely closed off, so that a flow of media in the hose is reduced or completely prevented. The force required to advance the clamping member can be generated manually or automatically, for example electromotively or electromagnetically, pneumatically or hydraulically.

The generic publication mentioned above discloses a special form of pinch valve which addresses the problem that the lumen of the hose may not reopen or not reopen completely when the clamping member is retracted, i.e. when it is moved away from the abutment, because the inner surface areas of the hose which have been pinched together adhere to one another and the inherent elasticity of the hose material is not sufficient to return the hose completely to its original shape. To solve this problem, the above-mentioned publication proposes that the clamping jaws of the clamping member be claw-like in design and pivot in opposite directions on the plunger of the clamping member so that together they form an openable and closable clamping mouth. When the valve is closed, i.e., when the clamping member is advanced, the clamping mouth should open so that the squeezing action closing the lumen of the hose is effected with the mouth base of the clamping mouth. When the valve is opened, i.e., when the clamping member is retracted, the clamping mouth should partially close, with the claw ends exerting a force directed radially inward on the fold edges of the squeezed hose. This force is redirected by the material stiffness of the hose into a force driving its adhering inner surface regions apart, which assists the inherent elasticity of the hose in restoring it to its original shape. In order to effect this mouth movement or jaw pivoting synchronized with the displacement of the clamping member, this publication proposes, among other things, that each clamping jaw be coupled to a suitably shaped sliding block track via a spacer carrying a corresponding sliding block and being attached to the free end of the clamping jaw. This coerces both the opening of the mouth during advancement of the clamping member and its closing during retraction of the clamping member, both by lateral interaction of the sliding blocks with the associated sliding block tracks. This is disadvantageous in that a closed sliding block track requires substantial installation space, which is not available inside a compact valve. In addition, a bidirectionally acting sliding block track must be very filigree and low-tolerance to avoid dead travel, which makes production more expensive and can easily lead to jamming and damage when worn.

SUMMARY

It is an object of the present invention to refine a known pinch valve such that the mechanical constraint of the clamping jaws can be made more robust, space-saving and cost-effective.

According to one formulation, this object is achieved in conjunction with features known from the art, in that the clamping member is mounted between two side walls of a valve housing, the side walls extending parallel to the hose guide axis and to the plunger guide axis and each of said side walls having a step extending parallel to the hose guide axis and receding with respect to the advancing direction of the plunger, wherein the clamping jaws, upon displacement of the clamping member, move over said steps with their outer sides, which are facing away from the hose guide, bearing against the side walls.

Preferred embodiments are also described and claimed below.

A further aspect of the invention is associated with a realization that no bidirectionally acting positive guidance is required to coerce the clamping mouth movement explained above. Instead, only a unidirectional positive guidance effective during the clamping member's retraction is required. When the clamping element is advanced, i.e., when the pinch valve is closed, the counterforce counteracting to the clamping member's advance and being exerted by the hose on the mouth base and on the end regions of the clamping jaws hinged there already causes the clamping jaws to pivot outwards and stabilizes them in an outwardly pivoted position corresponding to the open position of the clamping mouth. Even a pinch valve equipped with pivoting clamping jaws with no positive guidance at all would operate correctly at least during the advance of its clamping member, i.e., during closing. Constricting guidance is required only when the valve is opened, i.e. when the clamping member is retracted, and when the clamping jaws are to close inward against the stiffness of the hose by pivoting the clamping jaws. According to this aspect of the invention, this unidirectional constraint is achieved by the interaction of the clamping mouth outer sides with the stepped side walls. Due to the receding steps in the side walls, the channel in which the clamping member moves is narrower in the rear area where the clamping jaws are located when the clamping member is in its retracted position than in the front area where the clamping jaws are located when the clamping member is in its advanced position. Both channel areas are dimensioned so that the outer sides of the clamping jaws are in contact with the side walls at least at certain points—but in different pivoting positions. In the retracted position of the clamping element, the narrow channel width there, i.e. the small distance of the side walls from each other there, does not allow complete unfolding of the clamping jaws, i.e. complete opening of the clamping mouth. In the advanced position, the larger channel width there, i.e. the greater distance of the side walls from each other there, permits significantly further unfolding of the clamping jaws, i.e. significantly further opening of the clamping mouth. When the clamping element is advanced, the counterforce applied by the hose being squeezed always results in maximum opening of the clamping jaws within the framework of the respective spatial conditions. Near the retraction position, this is still incomplete. However, as soon as the contact points of the outer sides of the clamping jaws have passed over the step as herein described and claimed, the side walls no longer oppose a further opening of the clamping mouth, so that the clamping jaws, driven by the counterforce applied by the hose, pivot further outwards so that the hose is squeezed by the mouth base of the largely or—preferably—completely open clamping mouth. When the clamping member is retracted, the clamping mouth is forced into a closing movement as soon as the contact points on the outer sides of the clamping jaws pass over the steps, as herein described and claimed, since, as explained above, the space available between the side walls is simply not sufficient for a complete opening. The closing movement of the clamping mouth has the effect, known in principle from the prior art and already explained at the beginning, that the free ends of the claw-like clamping jaws exert a pressure on the fold edges of the squeezed hose, which then leads to a reopening of the previously shut hose lumen.

The incorporation of the steps, as herein described and claimed, into the side walls, which are present in compact pinch valves anyway, is easy in terms of manufacturing technology. A step structure in a solid wall is also extremely robust and largely wear-resistant. Also, such a structure is by no means filigree, so that even large tolerances that may result from manufacturing, wear of the mouth joints, rotational mispositioning of the clamping member or the like do not restrict the functionality of the valve.

Preferably, the steps are beveled at a shallow angle so that the closing or opening movement of the clamping mouth extends over a larger retraction path or advance path of the clamping element, which increases functional reliability and counteracts wear.

Mention has already been made above of the possibility of rotational misalignment of the clamping member, which is tolerable to a certain extent in accordance with some aspects of the invention. Nevertheless, it is best not allowed to get out of hand. In a further development of the invention, it is therefore provided that the side walls each have a first clamping member guide groove extending parallel to the plunger guide axis, the outer side of each associated clamping jaw bearing against the groove base of the first clamping member guide groove. The contact points of the clamping jaws' outer sides thus run along the groove base of the first clamping member guide grooves when the clamping member is displaced. The side walls of these first clamping member guide grooves thus form a guide channel directed in the direction of displacement of the clamping member, which counteracts rotation of the clamping member about its plunger guide axis. One skilled in the art can use the relative dimensioning of groove width to clamping mouth thickness to set suitable tolerances with respect to the rotation of the clamping member. The skilled person will understand that the step according to this aspect of the invention should (at least also) be present at the groove base of such a first clamping member guide groove, since in the aforementioned further development of the invention the interaction between the side wall, in particular the step, and the outside of the clamping mouth, which is salient to the invention, takes place precisely here.

Ideally, the clamping jaws each have a contact roller on their outer sides which can be rotated about an axis of rotation aligned parallel to the hose guide axis and with which the respective clamping mouth bears against the side wall assigned to it. In other words, the area of the outer side of the clamping mouth, which has hitherto been referred to merely as the contact point, is now in the form of a rotatable roller. This reduces the friction between the clamping mouth's outer side and the side wall, which on the one hand results in better smooth running of the system and on the other hand reduces the wear caused by operation. In the preferred case in which the claw-like shaping of the jaws leads to a kinked line of the mouth's outer side, the contact rollers are preferably positioned in this kink area.

Preferably, the contact rollers are toroidal in shape; this is particularly the case in embodiments in which they run in a first clamping member guide groove. On the one hand, the toroidal roller shape can compensate for rotational misalignments of the clamping element. On the other hand, interaction with the side walls of the first clamping member guide grooves results in only low friction.

The plunger of the clamping element is preferably designed in several parts with a plunger shaft and a plunger tip to which the clamping jaws are articulated. The plunger tip is advantageously detachably connected to the plunger shaft, particularly preferably via a ball latch mechanism. In contrast to the plunger shaft, the plunger tip provided with the clamping jaws is subject to considerable wear. Accordingly, its separate interchangeability is desirable, which is achieved by the aforementioned detachable multipart design. In addition, the interchangeability of the plunger tip together with the clamping jaws can also be used to adapt the pinch valve to different hose sizes. The dimensions of the clamping jaws, in particular the resulting clamping mouth width, should be matched to the hose size. Different hose sizes therefore reach for clamping members that are differently dimensioned at least in the area of the clamping mouth. By the aforementioned further development of the invention, such an adaptation can be carried out by simply exchanging the plunger tip without having to detach the plunger shaft from its motor drive. Since such an exchange of the plunger tip can occur quite frequently in routine operation, it is favorable to implement an easy-to-handle coupling between the plunger shaft and the plunger tip. However, this must nevertheless demonstrate absolute operational reliability. The preferred ball latch mechanisms have proven their worth here.

In addition to the clamping mouth width, the width of the hose guide should also be matched to the respective hose size. In order to ensure easy adaptability here as well, a particularly preferred embodiment of the invention provides that the hose guide consists of two axially spaced, replaceable housing inserts, in particular made of plastic, which together form an interrupted round bottom groove extending along the hose guide axis, the clamping member being arranged in a free space between the two housing inserts. The groove width or the radius of curvature of the round bottom groove is optimized for one hose size in each case. When changing the hose size, it is advisable to also replace the hose guide, i.e. the two housing inserts, with ones optimized for the new hose size. In addition, such housing inserts are subject to considerable wear. It is therefore advantageous to manufacture them from inexpensive plastic, whereas the housing, which gives the overall system its stability, is preferably made of metal. The arrangement of the housing inserts on both sides of the clamping member ensures stable fixation of the hose on both sides of the pinch region, which prevents slippage and optimizes the reproducibility of the valve function.

Preferably, the housing inserts each have a second clamping member guide groove extending parallel to the plunger guide axis in their mutually facing end faces, in each of which a corresponding guide projection of the clamping member engages. Similar to the first clamping member guide grooves mentioned above, the second clamping member guide grooves also counteract rotation of the clamping member about its plunger guide axis. The second clamping member guide grooves can be designed to be quite deep and therefore form a very precise guide for the clamping member without leading to an increase in the external dimensions of the pinch valve, as would be the case with a correspondingly deep design of the first clamping member guide grooves.

The pivot axes of the clamping jaws are preferably identical to each other, i.e. both clamping jaws can preferably be pivoted around the same pivot axis. However, especially for clamping valves with large-volume hoses, it can also be useful to arrange the pivot axes of the two clamping jaws with a parallel offset to each other. This can reduce the depth of the clamping mouth.

The abutment is advantageously part of an openable housing lid. When the lid is open, all replaceable elements can be inserted easily and the hose can be inserted into the hose guide. Access to the inside of the valve takes place in an area that is not occupied by a motorized drive of the plunger. Instead, it is located on the side of the housing facing away from the lid. After closing the lid, during which the abutment is also brought into its working position exactly opposite the clamping member, operation of the valve according to this aspect of the invention can begin immediately.

BRIEF DESCRIPTION OF THE DRAWINGS

Further details and advantages of the invention will be apparent from the following specific description and drawings, which show, in.

DETAILED DESCRIPTION

Identical reference signs in the figures indicate identical or analogous elements.

Figure 1:
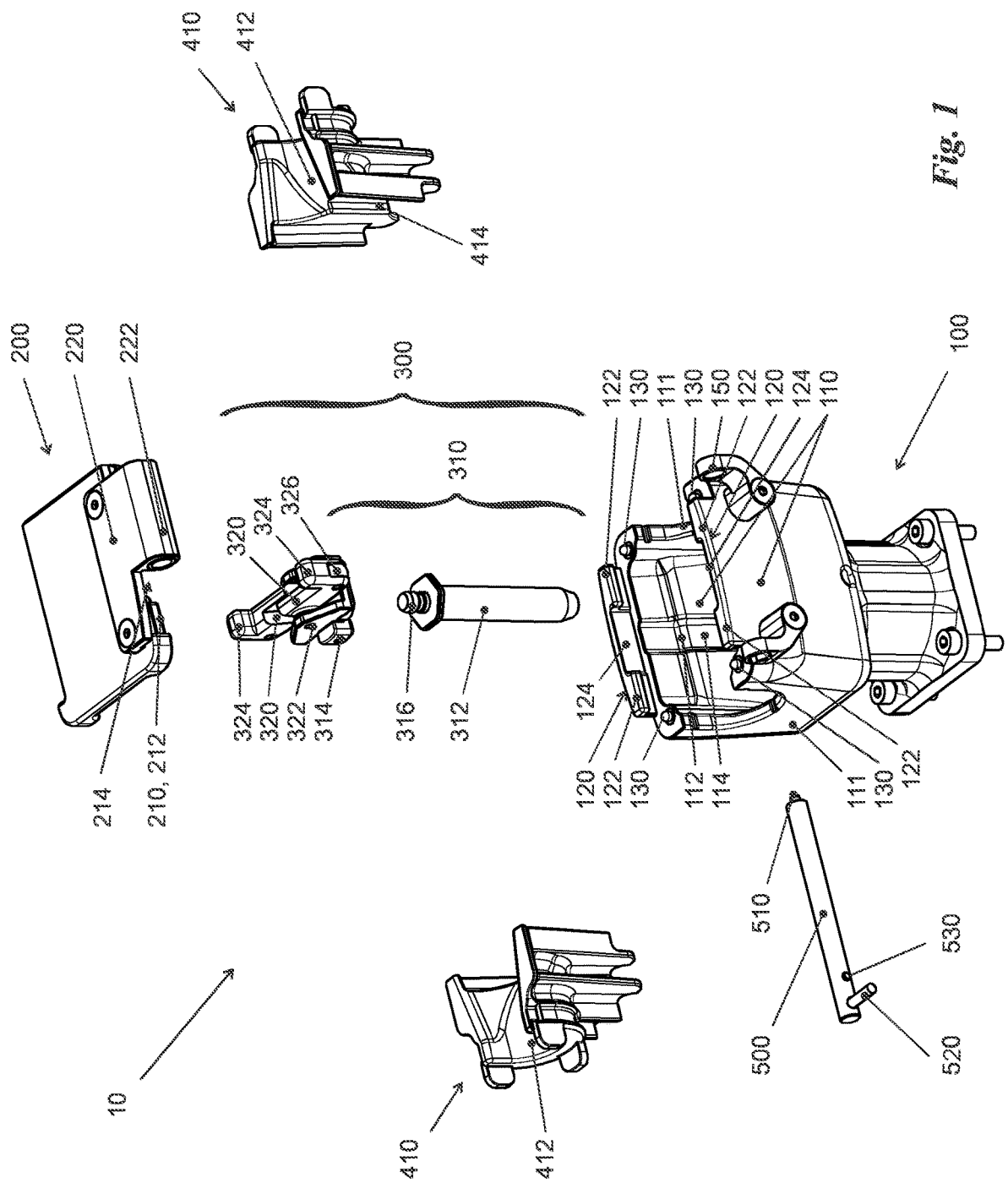
FIG. 1: An exploded view of a pinch valve according to one embodiment of the invention.

FIG. 1 shows an exploded view of a pinch valve 10 according to the present invention. The pinch valve 10 comprises a housing body 100 having longitudinally extending side walls 110 and end walls 111 provided with U-shaped recesses.

At their upper edges, the side walls 110 of the housing body 100 each carry a lid guide groove 120, which in the illustrated embodiment are formed as two sections 122 spaced apart by a gap 124.

At a central position, the inner sides of each of the side walls 110 of the housing body 100 include a vertically extending first clamping member guide groove 114 that shows a longitudinally extending step 112. The function of the step 112 will be discussed in further detail below in the context of FIGS. 3 and 4, each of which shows a sectional view through the pinch valve 10 in the plane of the first clamping member guide grooves.

Housing inserts 410 can be inserted into the cavity of the housing body 100, which have sections of a round bottom groove 412 and, together with the recesses of the end walls 111 of the housing body 100, form a hose guide 400 for a not shown, longitudinally extended, media-conducting, flexible hose. This hose guide 400 is particularly well recognizable in the illustration of FIG. 5. At their mutually facing end faces, the housing inserts 410 each have a vertically extending, clamping member guide groove 414, the function of which will be discussed in more detail below.

Figure 6:
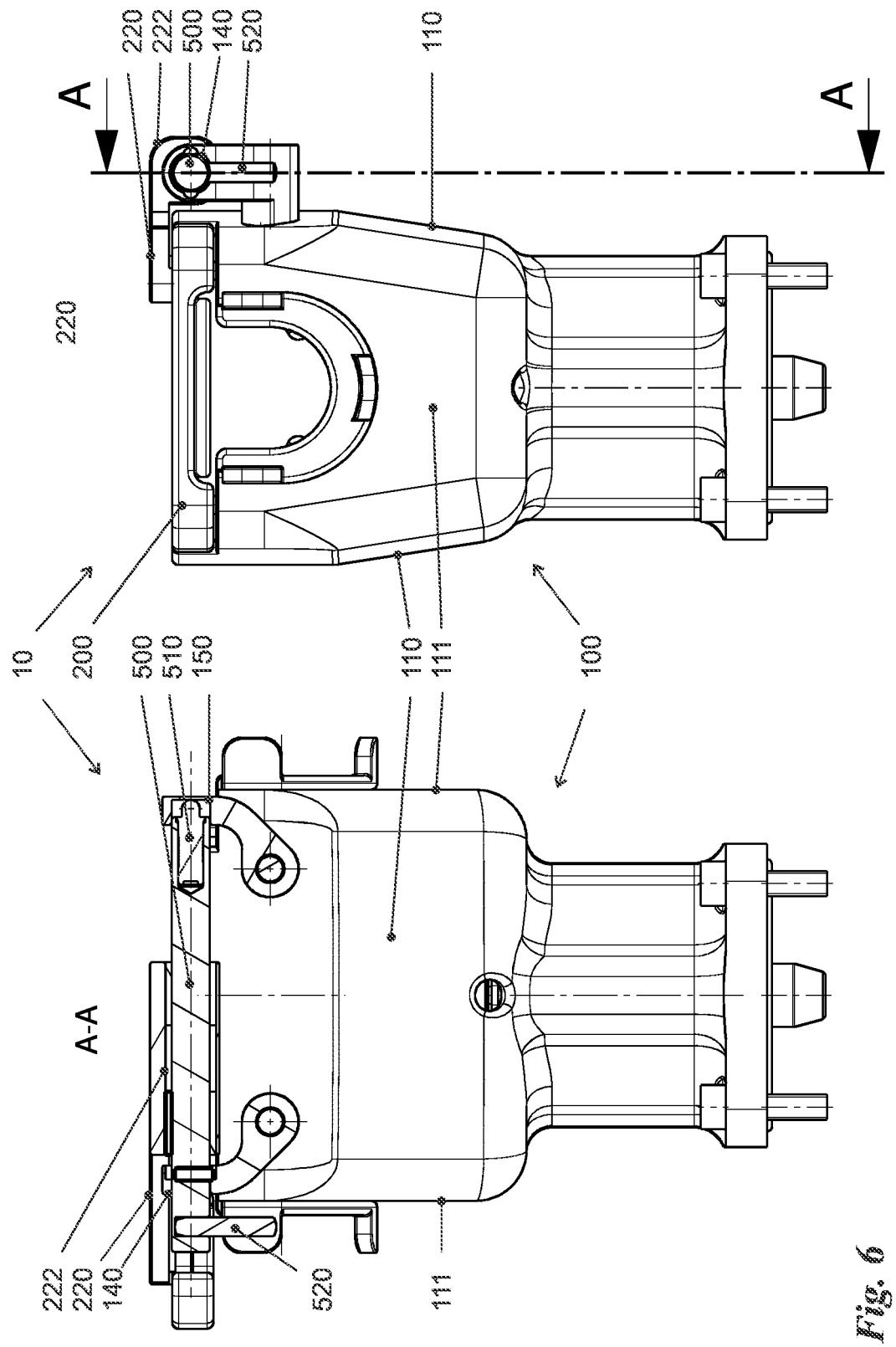
FIG. 6: a sectional view of the body of the pinch valve of FIG. 1 and FIG. 7: a sectional view of the body of the pinch valve of FIG. 1 without the pin.

One of the side walls 110 of the housing body 100 carries on its outer surface a first eye 140 and a second eye 150, which are formed and aligned longitudinally spaced from each other such that a bolt 500 can be inserted therein to undergo axial and rotational slide bearing. In the illustrated embodiment, the first eye 140 is formed as a through opening, and the second eye 150 is formed as a blind opening. In the illustrated embodiment, the bolt 500 has a spring biased stop element 510 at its distal end and an actuating lever 520 at its proximal end. In addition, in the illustrated embodiment, the bolt 500 has a radial projection 530 between its two ends in close proximity to the actuating lever 520. These elements and their function will be discussed in more detail below in the context of FIGS. 6 and 7.

Further, the pinch valve 10 includes a lid 200 having longitudinal sides each provided with a guide edge 210. In the embodiment shown, the guide edges 210 are each divided into two sections 212 that are spaced apart by a gap 214. These relationships are particularly evident in FIG. 5. In operation, the guide edges 210 interact with the lid guide grooves 120 of the housing body 100. In this case, the guide edges 210 can be inserted into the lid guide grooves 120, so that the aforementioned elements together form a displaceable slide bearing of the lid 200 on the housing body 100. Thus, by longitudinally displacing the lid 200, the housing body 100 which is open at the top can be closed or opened according to the principle of the sliding lid. The closed sliding position of the lid is defined by four spring-biased ball head pins 130, which are provided in the running surfaces of the housing body 100 and engage in corresponding latching recesses 230 in the underside of the lid 200. These latching recesses 230 can be seen in FIG. 5. The sections 122 and the gap 124 of the lid guide grooves 120 of the housing body 100 are adapted to the corresponding sections 212 and the gap 214 of the guide edges 210 of the lid 200 so that at least one sliding position of the lid exists in which two mutually opposite sections 212 of the guide edges 210 of the lid 200 come to lie in the mutually opposite gaps 124 of the lid guide grooves 120 of the housing body 100, so that the lid 200 can be lifted vertically from the housing body 100 or can be pivoted away from the latter about a pivot axis lying parallel to its side walls.

Figure 2:
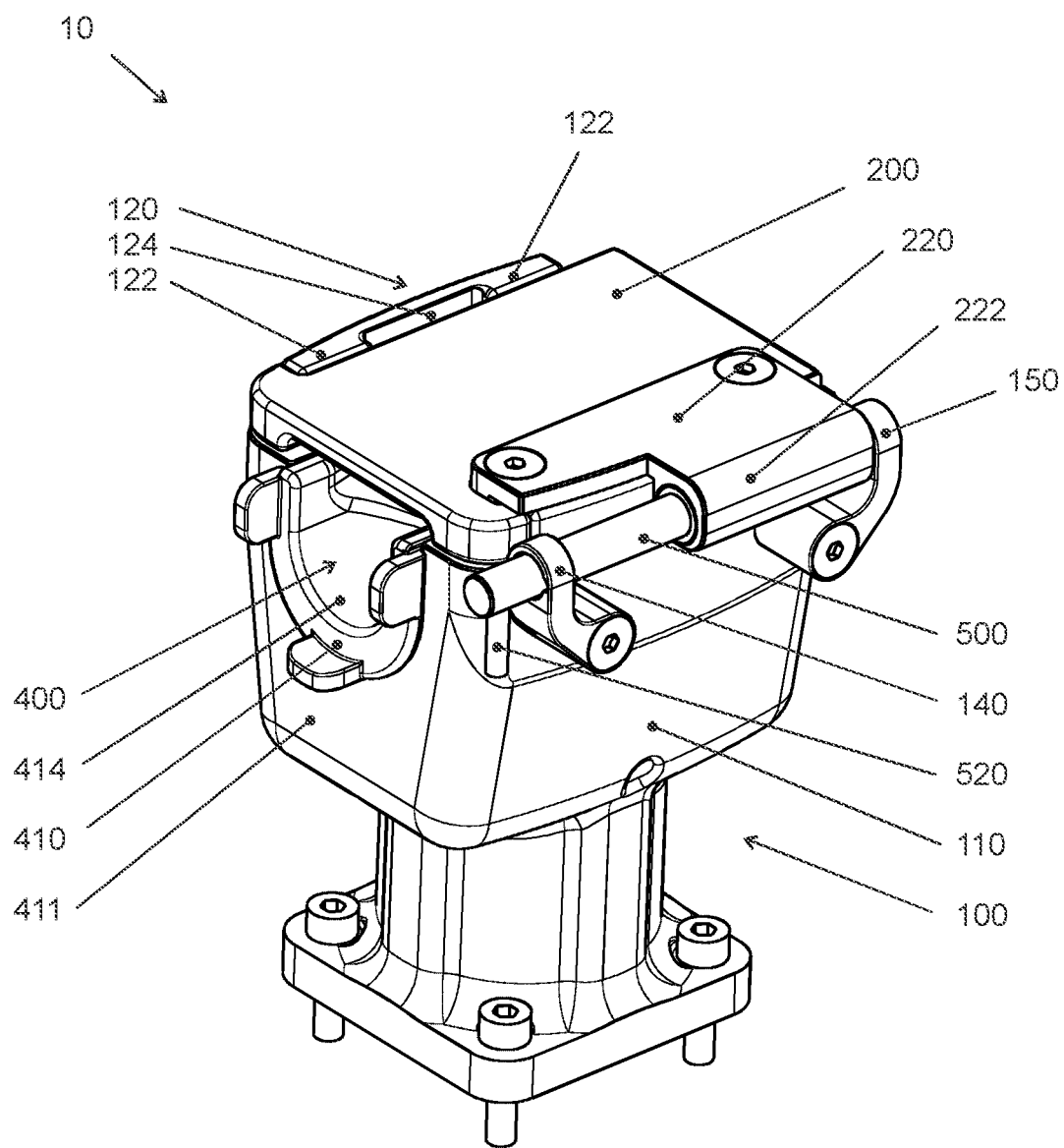
FIG. 2: A perspective view of the pinch valve of FIG. 1 in the assembled state with the lid closed.
Figure 5:
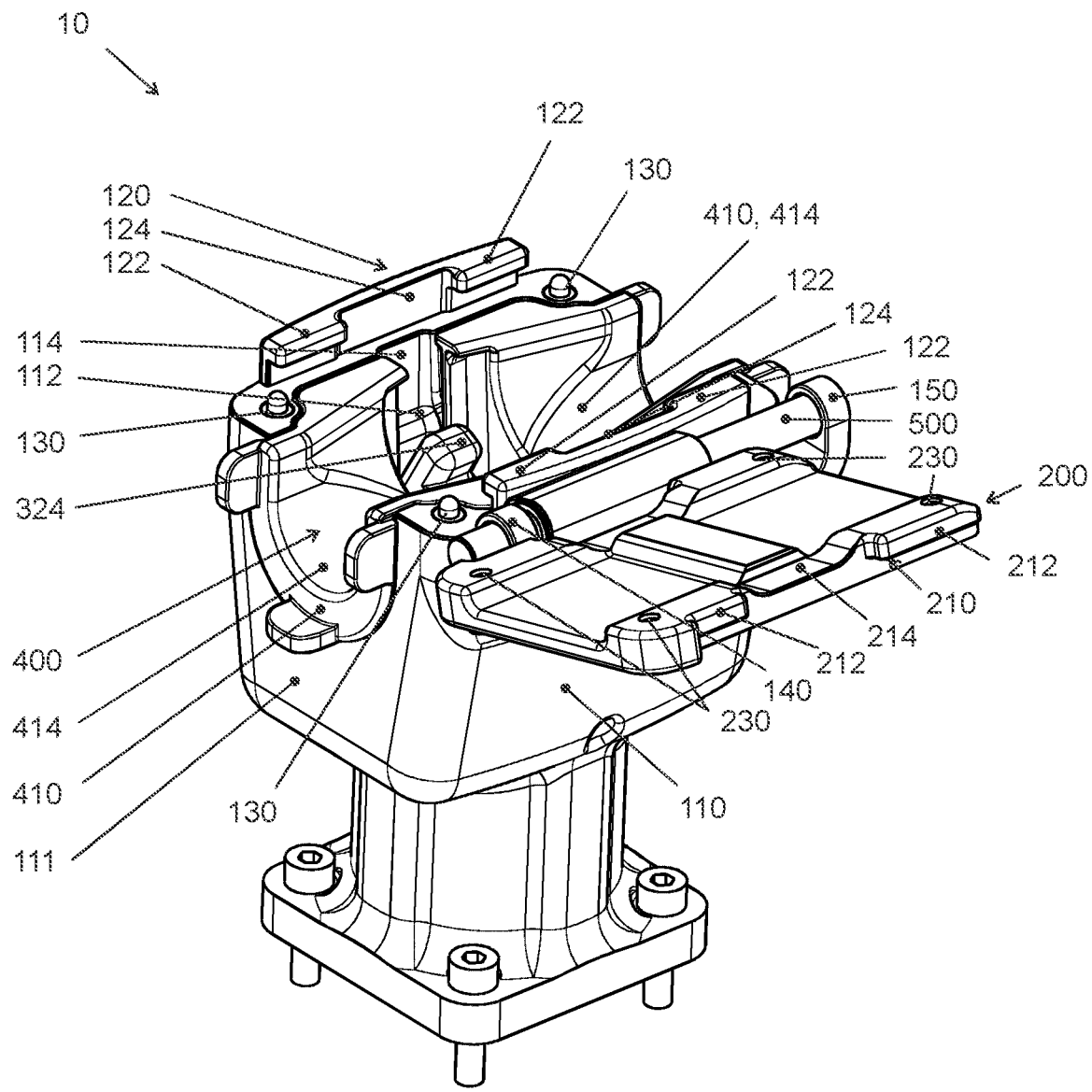
FIG. 5: A perspective view of the pinch valve of FIG. 1 in the assembled state with the lid open.

To provide such a pivot axis, the lid 200 has a tab 220 which laterally overhangs one of its guide edges 210. At its laterally outer end, the tab 220 carries a sleeve 222 which, in the assembled state of the housing, as can be seen in particular in FIGS. 2 and 5, is aligned with the eyes 140, 150 and the bolt 500 inserted therein, so that the bolt 500 together with the sleeve 222 forms an axial and rotational pivot bearing for the sleeve 222 and thus for the lid 200. It should be noted that the length of the sleeve 222 is dimensioned to be shorter than the distance between the two eyes 140, 150, so that axial displacement of the lid 200 relative to the housing body 100 is possible; in particular, when the guide edges 210 of the lid are in engagement with the lid guide grooves 120 of the housing body 100.

FIG. 1 further shows a clamping member 300 comprising a plunger 310 and two clamping jaws 320. In the embodiment shown, the plunger 310 is formed in two parts, namely with a plunger shaft 312 and a plunger tip 314, which carries an articulation 322 for the clamping jaws 320. The clamping jaws 320 are claw-like in shape and each have bent-up claw ends 324 at their tips. At the bend point of the claw ends 324, the clamping jaws 320 each have a contact roller 326 on their outer sides for interaction with the first clamping member guide grooves 114 of the housing body 100, which will be discussed in more detail below.

Figure 3:
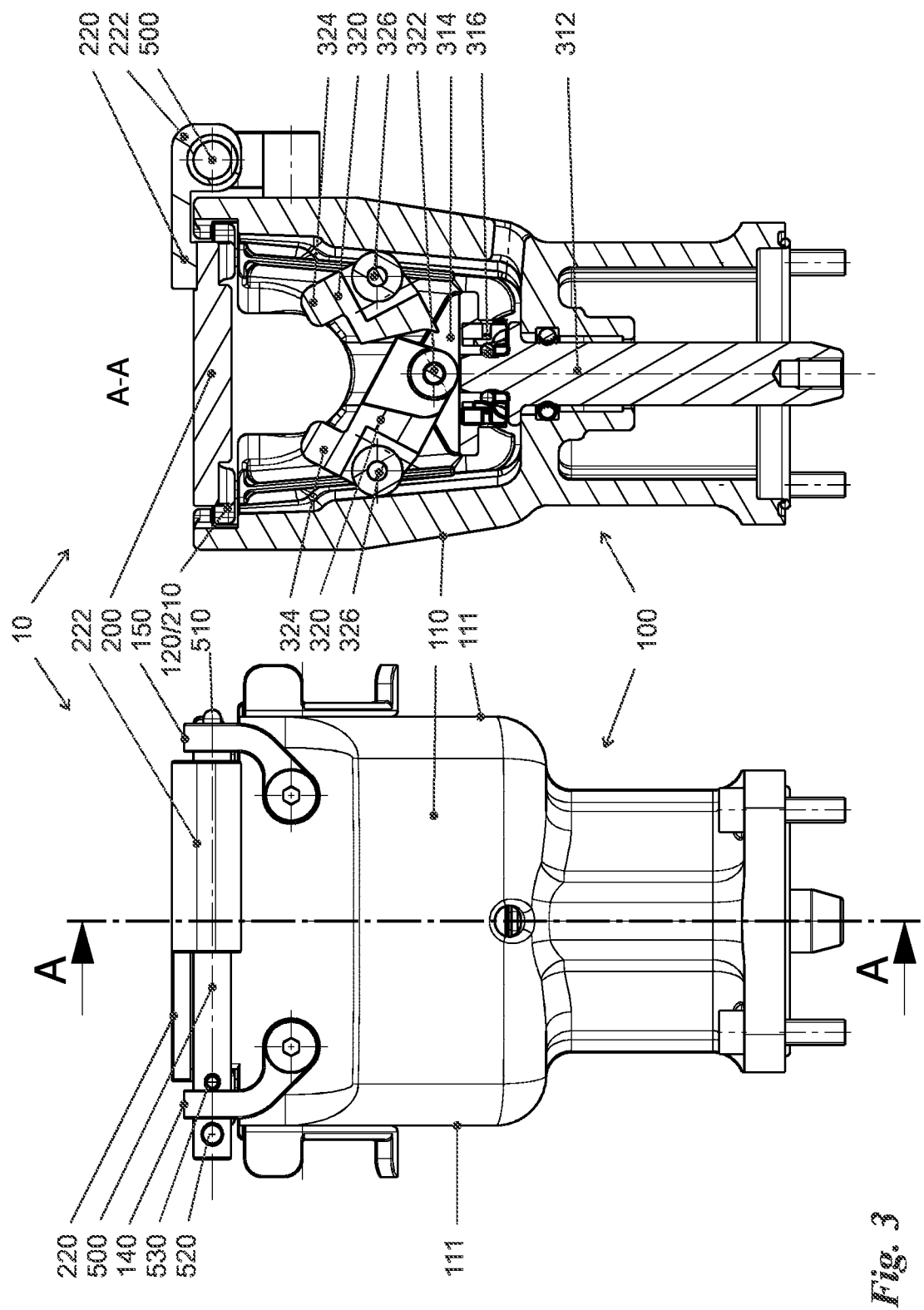
FIG. 3: A sectional view through the pinch valve of FIG. 2 in the open valve state.
Figure 4:
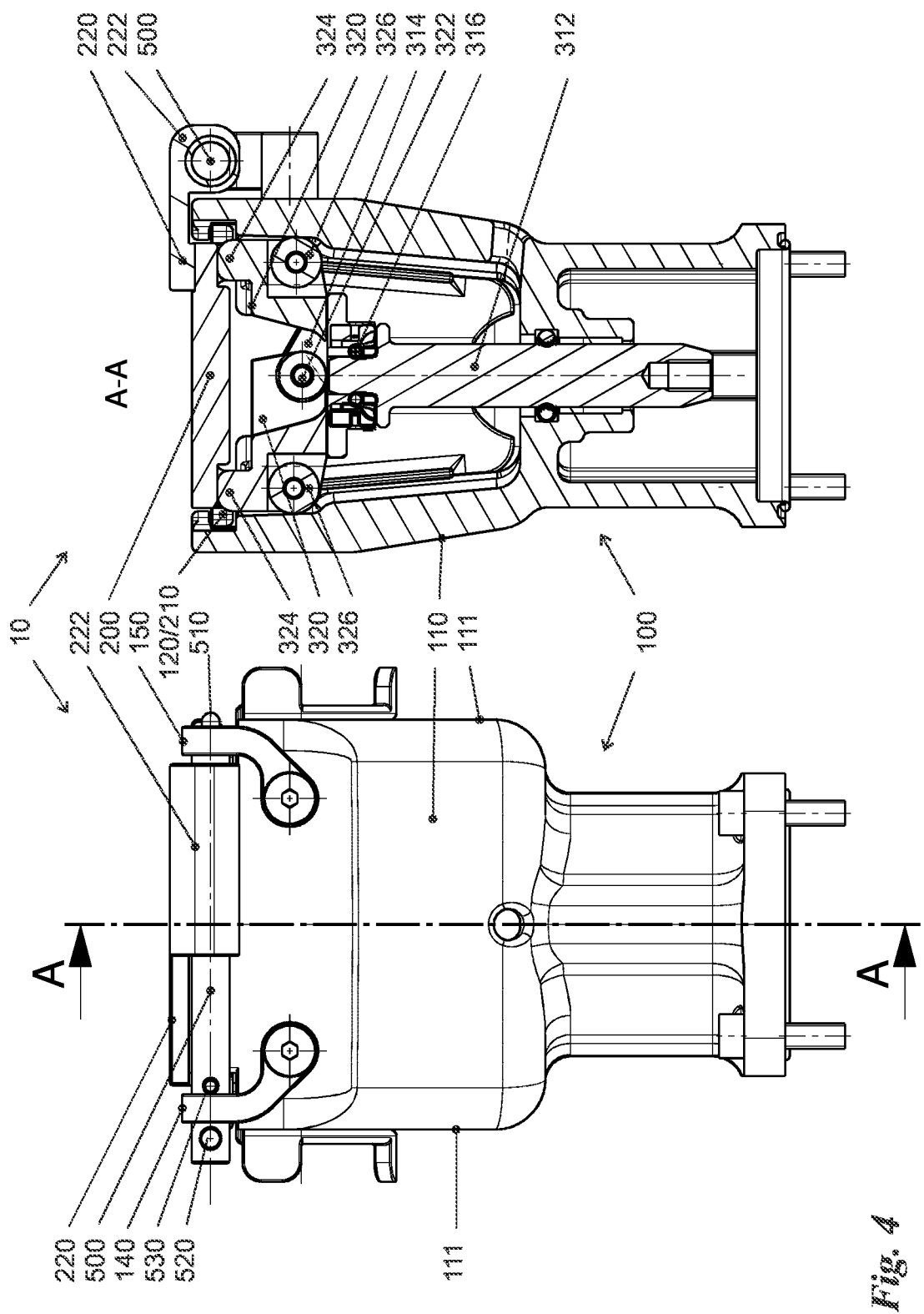
FIG. 4: A sectional view through the pinch valve of FIG. 2 in the closed valve state.

The plunger shaft 312 and the plunger tip 314 are releasably connected to each other through a ball latch mechanism 316, which is more particularly visible in the sectional view of FIGS. 3 and 4.

FIG. 2 shows the pinch valve 10 in the assembled state with the lid 200 closed. FIGS. 3 and 4 each show a sectional view of the pinch valve 10 of FIG. 2 in the valve open position (FIG. 3) and valve closed position (FIG. 4). The sectional planes A-A in FIGS. 3 and 4 are each marked in the auxiliary drawing shown to the left of the sectional view. It can be seen that the cut is transverse to the longitudinal direction of the pinch valve 10, i.e. transverse to the hose guide direction and centered so that the sectional plane is exactly centered on the first clamping member guide grooves 114. Due to the step 112, the channel formed between the side walls is narrower in its lower region than in its upper region. In the valve-open position, i.e. the retracted position of the clamping member 300 shown in FIG. 3, the clamping jaws 320 are located in the lower, narrower channel region. They bear with their contact rollers 326 against the groove base of the first clamping member guide grooves 312. As can be seen in FIG. 3, the relative dimensioning is such that the clamping mouth formed by the clamping jaws 320 is not completely open. Nevertheless, the clearance above the clamping mouth to the underside of the lid 200 is large enough to position a flexible, media-conducting hose in the hose guide 400; in particular, by inserting the hose into the round bottom grooves 412 of the housing inserts 410.

In order to close the valve, the clamping member 300 is advanced toward the lid so that the mouth base presses the hose against the lid 200, which acts as an abutment, narrowing or completely closing the lumen of the hose. During the advance of the plunger 310, the contact rollers 326 pass over the step 112 and thus enter the upper, wider channel region in which the clamping mouth can open completely. This opening of the clamping mouth is forced by the elasticity of the hose counteracting the plunger advance.

When the valve is to be reopened, the plunger is retracted. The contact rollers 326 again overcome the step 112, so that the clamping jaws 320 are pivoted towards each other by the smaller distance of the side walls 110 in the lower channel area, so that the clamping mouth partially closes again in the process. Here, the claw ends 324 press from laterally outside on the folded areas of the not yet fully opened hose and thus support the re-opening of its lumen even in cases where the inherent elasticity of the hose is not sufficient, for example due to an adhesion of the hose's inner walls to each other. The constrictive guidance of the clamping jaws 320 brought about by the step 112 in interaction with the contact rollers 326 represents a mechanically simple, very robust way of reliably coercing the immediate, complete re-opening of the hose lumen when the pinch valve 10 is opened. The arrangement of the step 112 in the first clamping member guide grooves 114 is not mandatory for functionality, but is advantageous in that it prevents rotation of the pinch member 300 about its plunger axis. The second clamping member guide grooves 114 in the opposing sides of the housing inserts 410 of the hose guide 400 represent a further measure for preventing such rotation. They interact with longitudinal projections of the plunger tip 314, which can be seen in FIG. 1 without any particular reference sign.

To replace the hose and/or the housing inserts and/or the clamping member and/or parts thereof, the lid 200 must be opened. As explained above, the closed position of the lid shown in FIG. 2 is defined by the latching engagement of the spring-biased ball head pins 130 of the housing body 100 in the corresponding latching recesses 230 of the lid 200. Furthermore, in this closed position, the guide edges 210 of the lid 200 are guided in the corresponding lid guide grooves 120 of the housing body 100. This means that the portions 212 of the guide edges 210 of the lid 200 are colocated with the corresponding portions 122 of the lid guide grooves 120 of the housing body 100. Vertical lifting or pivoting of the lid is not possible in this condition. Due to the spring biased ball head latching mechanism 130/230, the lid 200 is fixed in this position with no vertical or horizontal play. The sleeve 222, which coaxially grips the pin 500, does not have to support any forces in this position.

Longitudinal displacement of the lid is possible by applying a longitudinal force overcoming the latching mechanism 130/230. The sleeve 222 is thereby displaced longitudinally, i.e. in the axial direction of the bolt, on the bolt mounted in the eyes 140, 150—still without force. In a sliding position, in which the sections 212 of the guiding edge 210 of the lid 200 come into gap with the sections 122 of the lid guiding grooves 120 of the housing body 100, lifting or pivoting of the lid becomes possible, the spring bias of the ball head pins 130 pushing up the lid when this sliding position is reached and thus marking the sliding position in a recognizable manner. In this condition, the sleeve 222 together with the pin 500 can act as a pivot bearing for the lid 200 so that it can be moved to the swung open position shown in FIG. 5. In this position, the interior of the housing body 100 is accessible—in particular for the purpose of replacing the hose, housing inserts 410 and/or clamping member 300 or parts thereof.

The lid 200 can be closed in the reverse order, wherein the axial guide implemented by the sleeve 222 and the pin 500 enables the guide edges 210 of the lid 200 to be inserted into the lid guide grooves 120 of the housing body 100 securely and without tilting.

As mentioned, the interaction between sleeve 222 and bolt 500 is essentially free of axial forces. However, this is an idealized assumption. In practice, axial forces acting on the bolt 500 may arise, in particular due to permanent vibrations. Therefore, in the embodiment shown, an axial fixation of the bolt is provided which at the same time allows removal of the bolt for the purpose of complete removal of the lid 200. For illustration purposes, reference is made to FIGS. 6 and 7, which show different sectional views along sectional planes A-A, as indicated in the auxiliary drawings shown to the right of the respective sectional view. FIG. 7 also shows an enlarged view of section B of the corresponding sectional drawing.

As can be seen in said magnified view of the first eye 140 in FIG. 7, the first eye 140, which is designed as a through opening, carries a first groove 142, which is designed as a passage groove passing through the eye in the longitudinal direction. At an angular distance of 90°, a second groove 144 is arranged, which is formed as a longitudinally extending blind groove, the end face of which facing the second eye 150 is open. When the bolt 500 is inserted into the first eye, it is aligned with the aid of the actuating lever 520 so that its radial projection 530 is inserted into the first groove 242. The bolt is advanced so far that the radial protrusion 530 completely crosses the first groove 142 and comes to rest between the two eyes 140, 150. In particular, in the last phase, this movement takes place against the spring force of the spring-biased stop element 510, which in this phase strikes against the closed rear wall of the second eye 150 formed as a blind opening. Subsequently, the bolt is rotated by 90° with the actuating lever 520 so that its radial projection 530 comes to lie in front of the entrance of the second groove 144. Due to the spring force of the stop element 510, the bolt 500 is pressed into the second groove 144 formed as a blind groove when the actuating member 520 is released, this backward movement of the bolt 500 ending at the closed end of the second groove 144 when the radial projection 530 stops. The bolt 500 is dimensioned such that its distal end does not yet come free from the second eye 150, which is formed as a blind opening. The bolt 500 is thus secured axially and rotationally.

Removal of the bolt 500 requires pressure on its proximal end so that its radial projection 530 comes free from the blind groove 144 against the spring force of the stop element 510. Rotation of the bolt 500 by 90° then repositions its radial protrusion 530 in front of the passage groove 142, allowing the entire bolt to be pulled out of the two eyes 140, 150. In the embodiment shown, the first and second grooves 142, 144 are each formed in duplicate, so that the respective direction of rotation of the bolt during locking or unlocking is irrelevant.

The skilled person will understand that the isolated fixing and removal of the bolt 500 described above hardly plays a role in practice. More important is the articulation of the lid 200 with the bolt 500. The process described above is thus generally carried out with the lid 200 in the closed position, so that the bolt 500 can coaxially pass through the sleeve 222, which is then already positioned in a well-defined manner.

The embodiments discussed in the specific description and shown in the figures are only illustrative examples of embodiments of the present invention. Based on the disclosure set forth herein, those skilled in the art are provided with a wide range of possible variations to the structures and methods exemplarily discussed. The applicant seeks to cover also any changes and modifications as fall within the spirit and scope of the invention, as defined by the appended claims, and equivalents thereof.

LIST OF REFERENCE SIGNS

10 pinch valve
100 housing body
110 side wall
111 end wall
112 step
114 first clamping member guide groove
120 lid guide groove
122 section of 120
124 gap between 122
130 ball head pin
140 first eye
142 passage groove/first groove
144 blind groove/second groove
150 second eye
200 lid
210 guide edge
212 section of 210
214 gap between 212
220 tab
222 sleeve
230 latching recess
300 clamping member
310 plunger
312 plunger shaft
314 plunger tip
316 ball latch mechanism
320 clamping jaw
322 articulation
324 claw end
326 contact roller
400 hose guide
410 housing insert
412 round bottom groove
414 second clamping member guide groove
500 bolt
510 stop element
520 actuating lever
530 radial projection

What is claimed is:

1. A pinch valve, comprising:
a hose guide aligned along a hose guide axis,
a clamping member with
a plunger slidingly mounted along a plunger guide axis aligned perpendicularly to the hose guide axis, and two clamping jaws jointly forming a clamping mouth and being articulated to a front end of the plunger, wherein the front end faces the hose guide and the two clamping jaws are configured to pivot in opposite directions about respective pivot axes aligned in parallel to the hose guide axis, and an abutment arranged on a side of the hose guide opposite the clamping member, wherein the clamping member is configured to advance in an advancing direction, with at least a mouth base of the clamping mouth towards the abutment, to open the clamping mouth and to narrow and compress a lumen disposed within the hose guide, and thereby to close the pinch valve, wherein the clamping jaws are coupled to a mechanical constraint such that a retraction of the plunger starting from a maximally advanced clamping position of the clamping member produces a pivoting movement of the clamping jaws in a closing direction of the clamping mouth, wherein the clamping member is mounted between two side walls of a valve housing, the side walls extending in parallel to the hose guide axis and to the plunger guide axis and each of the side walls having a step that extends in parallel to the hose guide axis and that recedes with respect to the advancing direction of the plunger, and wherein the clamping jaws, upon displacement of the clamping member, move over the steps with outer sides that face away from the hose guide and bear against the side walls.

2. The pinch valve according to claim 1,
wherein the steps are beveled at a shallow angle with respect to the plunger guide axis.

3. The pinch valve according to claim 1,
wherein the side walls each have a first clamping member guide groove that extends in parallel to the plunger guide axis, and the outer side of each associated clamping jaw is configured to bear against a groove base of the first clamping member guide groove.

4. The pinch valve according to claim 1,
wherein the clamping jaws each, on the outer sides, carry a respective contact roller configured to rotate about a respective axis of rotation aligned in parallel to the hose guide axis, and wherein each respective clamping jaw is configured to bear against each associated side wall via the contact roller.

5. The pinch valve according to claim 4,
wherein the contact rollers are toroidally shaped.

6. The pinch valve according to claim 1,
wherein the plunger is configured in plural parts including a plunger shaft and a plunger tip, wherein the clamping jaws are articulated to the plunger tip, and wherein the plunger tip is detachably connected to the plunger shaft.

7. The pinch valve according to claim 6,
wherein the plunger tip is detachably connected to the plunger shaft via a ball latch mechanism.

8. The pinch valve according to claim 1,
wherein the hose guide comprises two axially spaced, replaceable housing inserts which together form an interrupted round bottom groove extending along the hose guide axis, and wherein the clamping member is arranged in a free space between the two housing inserts.

9. The pinch valve according to claim 8,
wherein the housing inserts are made of plastic.

10. The pinch valve according to claim 8,
wherein the housing inserts each have, in mutually facing respective end faces, a second clamping member guide groove which extend respectively in parallel to the plunger guide axis and into which a corresponding guide projection of the clamping member is configured to engage.

11. The pinch valve according to claim 1,
wherein the respective pivot axes of the clamping jaws are mutually coincident.

12. The pinch valve according to claim 1,
further comprising a lid that is configured to pivot relative to one of the side walls and which comprises the abutment.

* * * * *